(12) United States Patent
Homer et al.

(10) Patent No.: US 7,589,647 B2
(45) Date of Patent: Sep. 15, 2009

(54) COMPUTING DEVICE ANTENNA IDENTIFICATION SYSTEM AND METHOD

(75) Inventors: Steven S. Homer, Houston, TX (US); Paul J. Doczy, Houston, TX (US); Timothy Neill, Houston, TX (US); Paul N. Walker, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 11/412,368

(22) Filed: Apr. 27, 2006

(65) Prior Publication Data

US 2007/0252699 A1 Nov. 1, 2007

(51) Int. Cl.
*H04B 14/00* (2006.01)
(52) U.S. Cl. ............................ 340/999; 340/825.72
(58) Field of Classification Search .............. 340/999, 340/825.72; 455/13.3; 710/15, 16
See application file for complete search history.

(56) References Cited

U.S. PATENT DOCUMENTS 5,752,202 A * 5/1998 Obright ................. 455/574
5,754,588 A * 5/1998 Tanaka ................. 340/825.72
6,157,312 A * 12/2000 Sheridan et al. ............. 340/999
6,163,274 A * 12/2000 Lindgren ................. 340/7.29
6,693,513 B2 2/2004 Tuttle
6,992,599 B2 * 1/2006 Vergnaud et al. ............. 340/999
2004/0137912 A1 7/2004 Lin
2004/0203347 A1 10/2004 Nguyen
2005/0075136 A1 4/2005 Cromer et al.
2007/0188351 A1* 8/2007 Brown et al. ................. 340/999

FOREIGN PATENT DOCUMENTS

| EP | 0622794 | 11/1994 |
|---|---|---|
| EP | 0987618 | 3/2000 |
| EP | 1503450 | 2/2005 |
| WO | WO 99/42997 | 8/1999 |
| WO | WO 00/65445 | 11/2000 |

OTHER PUBLICATIONS

International Search Report Dated Aug. 24, 2007.

* cited by examiner

*Primary Examiner*—John A Tweel, Jr.

(57) ABSTRACT

A portable computing device antenna identification system comprises an antenna configured to be disposed in the portable computing device, the antenna having a sensor connector uniquely configured to transmit a signal indicative of an identity of the antenna.

21 Claims, 2 Drawing Sheets

US 7,589,647 B2

COMPUTING DEVICE ANTENNA IDENTIFICATION SYSTEM AND METHOD

BACKGROUND OF THE INVENTION

An increasing number of computer systems are being configured or are configurable for wireless communications. For example, such computer systems generally comprise a radio or wireless module and an antenna for transmitting and receiving radio frequency (RF) signals. The RF spectrum used by such wireless communication systems is strictly regulated (e.g., by the Federal Communication Commission) at least because of unknown health concerns associated with particular untested RF frequencies and/or because different RF bandwidths are reserved for different services or applications (e.g., military, aviation and commercial broadcasts). However, because of the wireless configurability of such computer systems, a consumer-configured, or even manufacturer-configured, computer system having wireless communication capabilities may violate the RF spectrum regulations.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-3C of the drawings, like numerals being used for like and corresponding parts of the various drawings.

Figure 1:
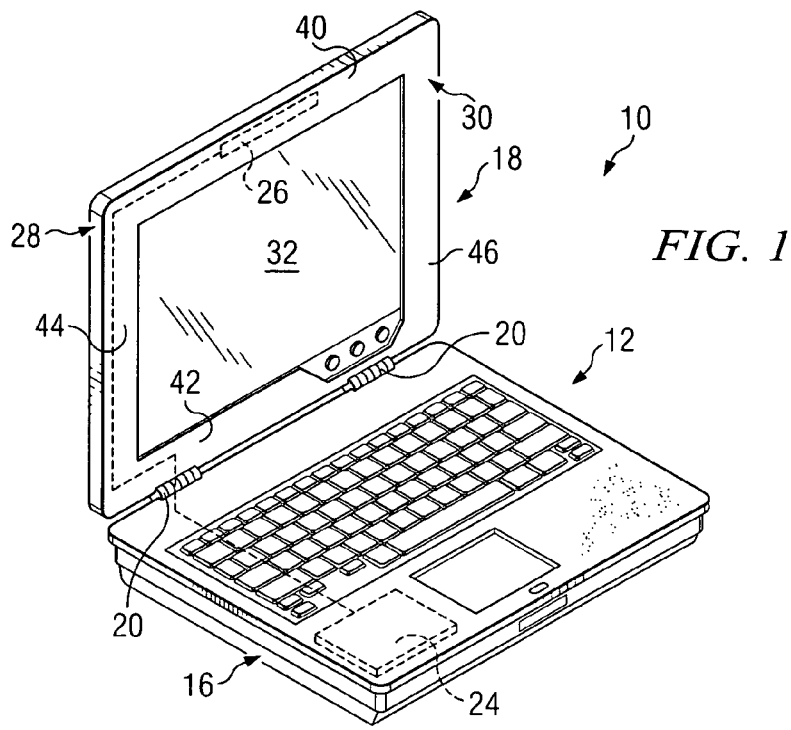
FIG. 1 is a diagram illustrating an embodiment of a computing device antenna identification system in accordance with the present invention.

FIG. 1 is a diagram illustrating an embodiment of an antenna identification system 10 for a computing device 12 in accordance with the present invention. Computing device 12 may comprise any type of computer device such as, but not limited to, a portable laptop or notebook computer, tablet computer, personal digital assistant, desktop computer, computer docking station, or any other type of portable or non-portable computer or computer-related device having wireless communication capabilities. In the embodiment illustrated in FIG. 1, computing device 12 comprises a base member 16 rotatably coupled to a display member 18 by hinge assemblies 20. In the embodiment illustrated in FIG. 1, computing device 12 is configured for wireless communications having a radio or wireless module 24 disposed in base member 16. The wireless module 24 is communicatively coupled to an antenna 26 disposed in display member 18. In the embodiment illustrated in FIG. 1, computing device 12 is illustrated as having only a single wireless module 24 and single antenna 26. However, it should be understood that computing device 12 may be configured with additional wireless modules and/or antennas, separate wireless module/antenna combinations and/or a single wireless module coupled to a plurality of antennas. Further, it should be understood that wireless module 24 and/or antenna 26 may be otherwise located in computing device 12 (e.g., both solely in display member 18, both solely in base member 16, or reversed (e.g., antenna 26 in base member 16 and wireless module 24 in display member 18)).

In the embodiment illustrated in FIG. 1, display member 18 comprises a housing 28 for supporting a display screen 32, and a bezel 30 disposed about a periphery of display screen 32. Bezel 30 comprises a top portion 40, bottom portion 42, and side portions 44 and 46. In FIG. 1, antenna 26 is disposed behind top portion 40 of bezel 30 near an upper portion of display member 18 (e.g., when display member 18 is an open position as illustrated in FIG. 1) to facilitate wireless communications to and from computing device 12. However, it should be understood that antenna 26 may be otherwise located.

Figure 2:
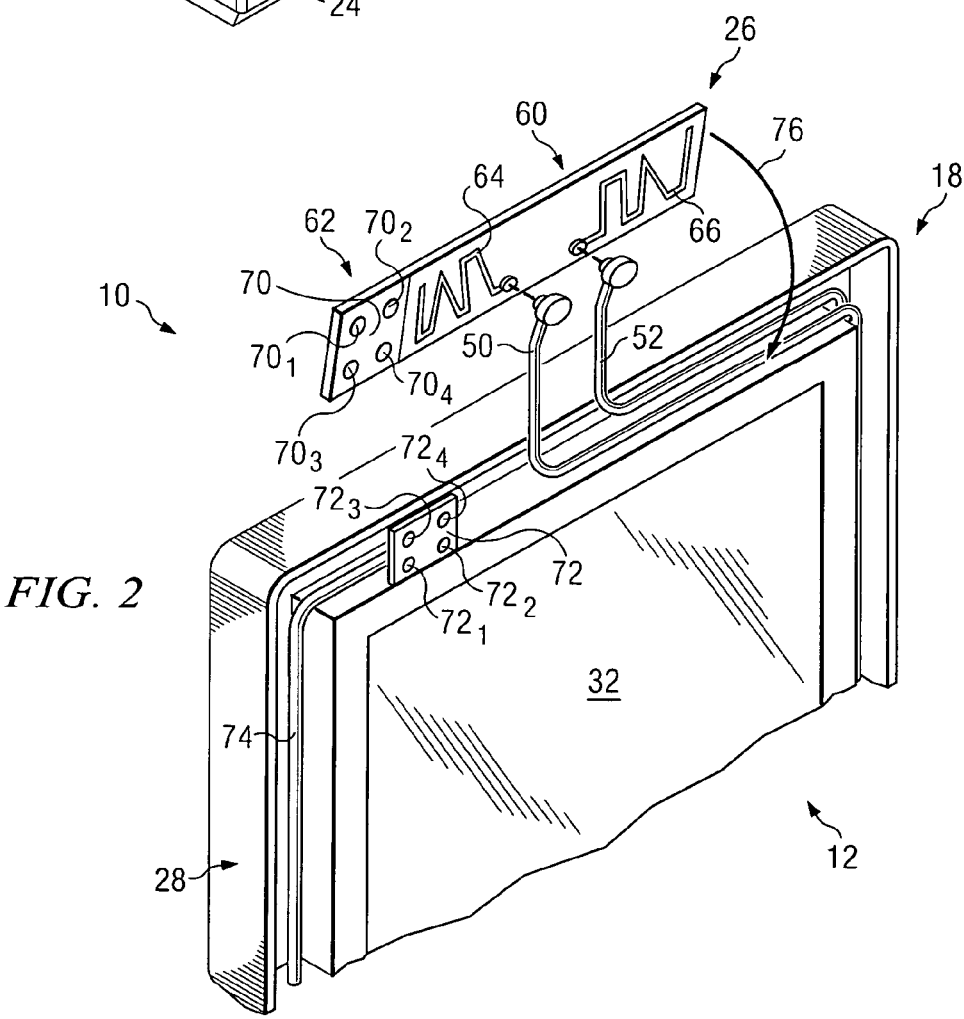
FIG. 2 is a diagram illustrating the computing device antenna identification system of FIG. 1 with a portion of the computing device removed.

FIG. 2 is a diagram illustrating antenna identification system 10 of FIG. 1 with a portion of bezel 30 removed and antenna 26 illustrated in an exploded position relative to display member 18. In the embodiment illustrated in FIG. 2, antenna 26 is couplable to wireless module 24 (FIG. 1) via conduits or cables 50 and 52. Cables 50 and 52 preferably transmit and/or otherwise transfer communication signals, power/ground signals and/or other data or non-data signals between antenna 26 and wireless module 24. However, it should be understood that antenna 26 may be otherwise coupled to wireless module 24 and/or other components of computing device 12.

In the embodiment illustrated in FIG. 2, antenna 26 comprises an antenna portion 60 and an identification portion 62. Antenna portion 60 is configured having one or more antennas 64 and 66 for transmitting/receiving wireless signals and/or communications. Identification area 62 is preferably configured to uniquely identify antenna 26 to facilitate compatible pairing of antenna 26 with a particular wireless module 24 (FIG. 1). For example, in the embodiment illustrated in FIG. 2, identification portion 62 comprises a sensor connector 70 configured to be couplable to a corresponding sensor connector 72 disposed within display number 18. Sensor connectors 70 and 72 may comprise a pin/pad, pin/receptacle and/or other type of engagement mechanism to facilitate coupling sensor connectors 70 and 72 together to facilitate signal communications therebetween.

Sensor connector 72 is communicatively couplable to wireless module 24 (FIG. 1) and/or other components of computing device 12 via conduits or cables 74. Preferably, sensor connector 72 is universally configured to facilitate coupling of sensor connector 72 to a variety of different types of antennas 26 (e.g., different models, different manufacturers, antennas having different operating parameters, etc.). Additionally, sensor connector 70 is preferably uniquely configured for each different type of antenna 26 such that, based on the type of antenna 26 disposed in computing device 12 and coupled to sensor connector 72, a unique signal indicative of the identity of antenna 26 is communicated to sensor connector 72. Thus, the unique signal indicative of the identity of antenna 26 is communicatable to wireless module 24 and/or other components of computing device 12 to facilitate a comparison of the identity of antenna 26 with compatibility and/or pairing information related to wireless module 24.

In the embodiment illustrated in FIG. 2, sensor connector 70 comprises a plurality of sensor connector elements $70_1$, $70_2$, $70_3$ and $70_4$ couplable to corresponding sensor connector elements $72_1$, $72_2$, $72_3$ and $72_4$ of connector sensor 72. In the embodiment illustrated in FIG. 2, sensor connector 70 comprises four connector elements $70_1$-$70_4$; however, it should be understood that a greater or lesser quantity of connector elements may be used on sensor connector 70 and, correspondingly, on sensor connector 72. Preferably, sensor connector elements $70_1$-$70_4$ are uniquely configured to generate and/or otherwise transmit a unique signal indicative of the identity of antenna 26. For example, in some embodiments of the present invention, sensor connector elements $70_1$-$70_4$ are configured to generate and/or otherwise transmit a unique binary signal indicative of the identity of antenna 26. In this example, sensor connector elements $70_1$-$70_4$ are uniquely configured to transmit and/or otherwise communicate either a HI signal (e.g., a binary "1" signal) or a LO signal (e.g., a binary "0" signal). Thus, based on which sensor connector elements $70_1$-$70_4$ are transmitting HI or LO signals, a unique binary signal is communicated by antenna 26 to sensor connector 72 indicative of the identity of antenna 26. In FIG. 2, antenna 26 is illustrated in a rotated position relative to connector element 72 to better illustrate the connection between connector elements $70_1$-$70_4$ and respective connector elements $72_1$-$72_4$ such that rotation of antenna 26 in the direction indicated by arrow 76 relative to display member 18 places connector elements $70_1$-$70_4$ into alignment with respective connector elements $72_1$-$72_4$.

Figure 3A:
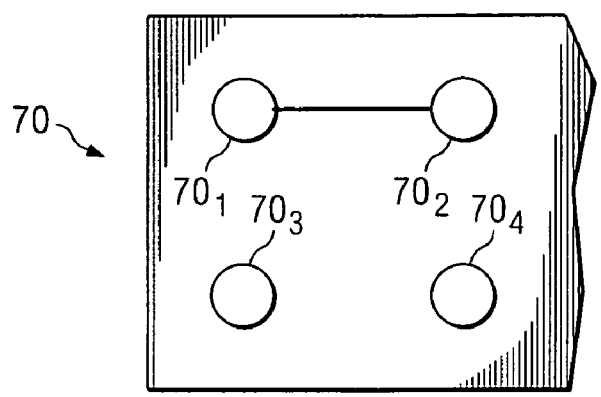
FIGS. 3A-3C are diagrams illustrating embodiments of an antenna connector configuration of the antenna identification system illustrated in FIG. 1 in accordance with the present invention.
Figure 3B:
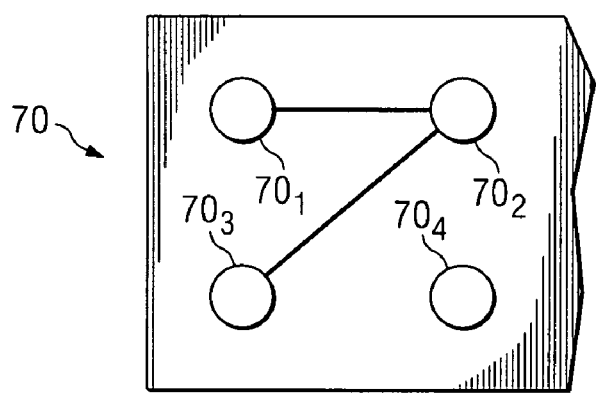
Figure 3C:
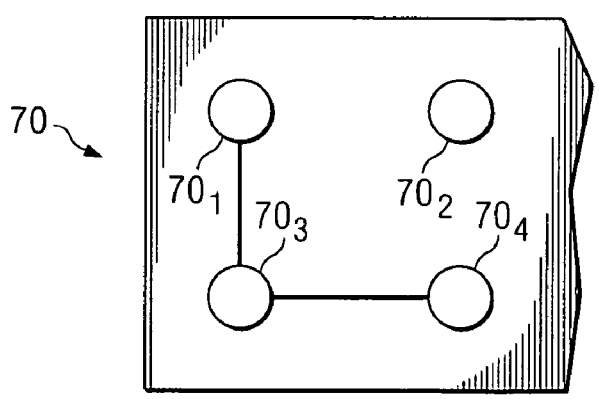

FIGS. 3A-3C are diagrams illustrating different embodiments of sensor connector 70 for generating different unique identification signals corresponding to three different antenna 26 identities. For ease of description and illustration, in the embodiments illustrated in FIGS. 3A-3C, sensor connector element $70_1$ is configured as a ground element and sensor connector elements $70_2$-$70_4$ are configured as signal elements. Thus, in the embodiments illustrated in FIGS. 3A-3C, three signals are used to identify a particular type of antenna 26 (e.g., signals from sensor connector elements $70_2$-$70_4$), thereby resulting in eight different binary signal combinations. However, as discussed above, a greater or lesser quantity of sensor connector elements may be used to create fewer or greater quantities of unique signal combinations.

In the embodiments illustrated in FIGS. 3A-3C, one or more sensor connector elements $70_2$-$70_4$ are bridged together and/or to ground (e.g., to sensor connector element $70_1$) while remaining sensor connector elements $70_2$-$70_4$, if any, are coupled to a voltage source (e.g., via cables 50 and/or 52 (FIG. 2)). For example, referring to FIG. 3A, sensor connector element $70_2$ is bridged and/or otherwise coupled to sensor connector element $70_1$ (ground), and sensor connector elements $70_3$ and $70_4$ are coupled to a voltage source. Thus, in the embodiment illustrated in FIG. 3A, the voltage level at sensor connector elements $70_3$ and $70_4$ is indicative and/or otherwise interpreted as a HI signal (e.g., a binary "1") and the ground at sensor connector element $70_2$ is indicative and/or otherwise interpreted as a LO signal (e.g., a binary "0"). Thus, if sensor connector element $70_2$ is identified and/or otherwise interpreted as the least significant bit and has a value of "0," sensor connector element $70_3$ has a value of "1," and sensor connector element $70_4$ is identified and/or otherwise interpreted as the most significant bit and has a value of "1," for three-bit binary word, the unique configuration of sensor connector 70 illustrated in FIG. 3A generates a three-digit binary word of "110." Preferably, the binary value "110" is used to designate and/or otherwise identify a particular type of antenna 26.

Referring to FIG. 3B, sensor connector elements $70_2$ and $70_3$ are bridged and/or otherwise coupled to ground (e.g., coupled to sensor connector element $70_1$), thereby resulting in LO signals at sensor connector elements $70_2$ and $70_3$, and sensor connector element $70_4$ is coupled to a voltage source resulting in a HI signal at sensor connector element $70_4$. Thus, in the embodiment illustrated in FIG. 3B, if sensor connector element $70_2$ is identified and/or otherwise interpreted as the least significant bit and has a value of "0," sensor connector element $70_3$ has a value of "0," and sensor connector element $70_4$ is identified and/or otherwise interpreted as the most significant bit and has a value of "1," a three-digit binary signal of "100" is generated and/or otherwise transmitted by antenna 26. Referring to FIG. 3C, sensor connector elements $70_3$ and $70_4$ are bridged and/or otherwise coupled to ground (e.g., sensor connector element $70_1$), thereby resulting in LO signals at sensor connector elements $70_3$ and $70_4$, and sensor connector element $70_2$ is coupled to a voltage source resulting in a HI signal at sensor connector element $70_2$. Thus, in the embodiment illustrated in FIG. 3C, if sensor connector element $70_2$ is identified and/or otherwise interpreted as the least significant bit and has a value of "1," sensor connector element $70_3$ has a value of "0," and sensor connector element $70_4$ is identified and/or otherwise interpreted as the most significant bit and has a value of "0," a three-digit binary signal having a value of "001" is generated and/or otherwise transmitted by antenna 26. Thus, as illustrated in FIGS. 3A-3C, various combinations of connector elements may be bridge and/or otherwise configured to transmit either a HI or LO signal to create a unique binary value indicative of a particular antenna 26 identity. Preferably, the signal generated and/or otherwise transmitted by antenna 26 is used to verify compatibility of the particular antenna 26 with a particular wireless module 24 disposed in computing device 12 and/or used to enable/disable wireless communications for computing device 12.

Thus, embodiments of the present invention provide a universal attachment mechanism for enabling attachment of a plurality of different types of antennas in a computing device while each antenna is uniquely configured to communicate a signal indicative of its identity, thereby facilitating compatibility and/or pairing compliance of the particular antenna with a particular wireless module.

What is claimed is:

1. A portable computer, comprising:
   a base coupled to a display;
   plural antennas coupled to a wireless module; and
   a sensor that transmits a signal indicative of a unique identity for each of the plural antennas to the wireless module.

2. The portable computer of claim 1, wherein the sensor is configured to transmit a binary signal indicative of the unique identity of the plural antennas.

3. The portable computer of claim 1, wherein the plural antennas include different types of antennas.

4. The portable computer of claim 1, wherein the signal pairs a single one of the plural antennas with the wireless module.

5. The portable computer of claim 1, wherein each of the plural antennas have different operating parameters.

6. The portable computer of claim 1, wherein the signal facilitates a comparison of an identity of one of the plural antennas with compatibility information of the wireless module.

7. The portable computer of claim 1, wherein the sensor includes plural sensors with each of the plural sensors transmitting a unique signal that identifies one of the plural antennas.

8. The portable computer of claim 1, wherein the plural antennas include antennas of different types, and the signal identifies a particular type of antenna.

9. A portable computer, comprising:
   a base with a display;
   a wireless module; and an antenna identification system connected to the wireless module and including an antenna portion with plural antennas and an identification portion, wherein the identification portion transmits a signal to the wireless module to identify a type of the plural antennas.

10. The portable computer of claim 9, wherein the plural antennas have different operating parameters.

11. The portable computer of claim 9, wherein the plural antennas are different models.

12. The portable computer of claim 9, wherein the plural antennas are different types of antennas.

13. The portable computer of claim 9, wherein the signal uniquely identifies the plural antennas to facilitate compatible pairing of one of the plural antennas with the wireless module.

14. A computer, comprising:
a base with a display;
first and second antennas; and
first and second sensors connected to the first and second antennas, wherein the first sensor transmits a first signal that uniquely identifies the first antenna, and the second sensors transmits a second signal that uniquely identifies the second antenna.

15. The computer of claim 14, wherein the first and second sensors are different types of sensors.

16. The computer of claim 14, further comprising a wireless module connected to the first and second sensors, wherein the first and second signals are transmitted to the wireless module to facilitate compatible pairing of the first and second antennas with the wireless module.

17. The computer of claim 14, wherein the first and second signals verify compatibility of the first and second antennas with a wireless module disposed in the computer.

18. The computer of claim 14, wherein the first signal uniquely identifies the first antenna, and the second signal uniquely identifies the second antenna.

19. The computer of claim 14, wherein the first and second antennas and the first and second sensors are disposed in the display.

20. The computer of claim 14, wherein the computer is a notebook computing device.

21. A notebook computer, comprising:
a wireless module; and
an antenna identification system that includes antennas connected to a sensor identification portion that transmits a signal indicative of an identify of one of the antennas to the wireless module.

* * * * *

UNITED STATES PATENT AND TRADEMARK OFFICE
CERTIFICATE OF CORRECTION

PATENT NO. : 7,589,647 B2
APPLICATION NO. : 11/412368
DATED : September 15, 2009
INVENTOR(S) : Steven S. Homer et al.

It is certified that error appears in the above-identified patent and that said Letters Patent is hereby corrected as shown below:

In column 5, line 22, in Claim 14, delete "sensors" and insert -- sensor --, therefor.

Signed and Sealed this

Ninth Day of November, 2010

David J. Kappos
*Director of the United States Patent and Trademark Office*